Patented May 17, 1949

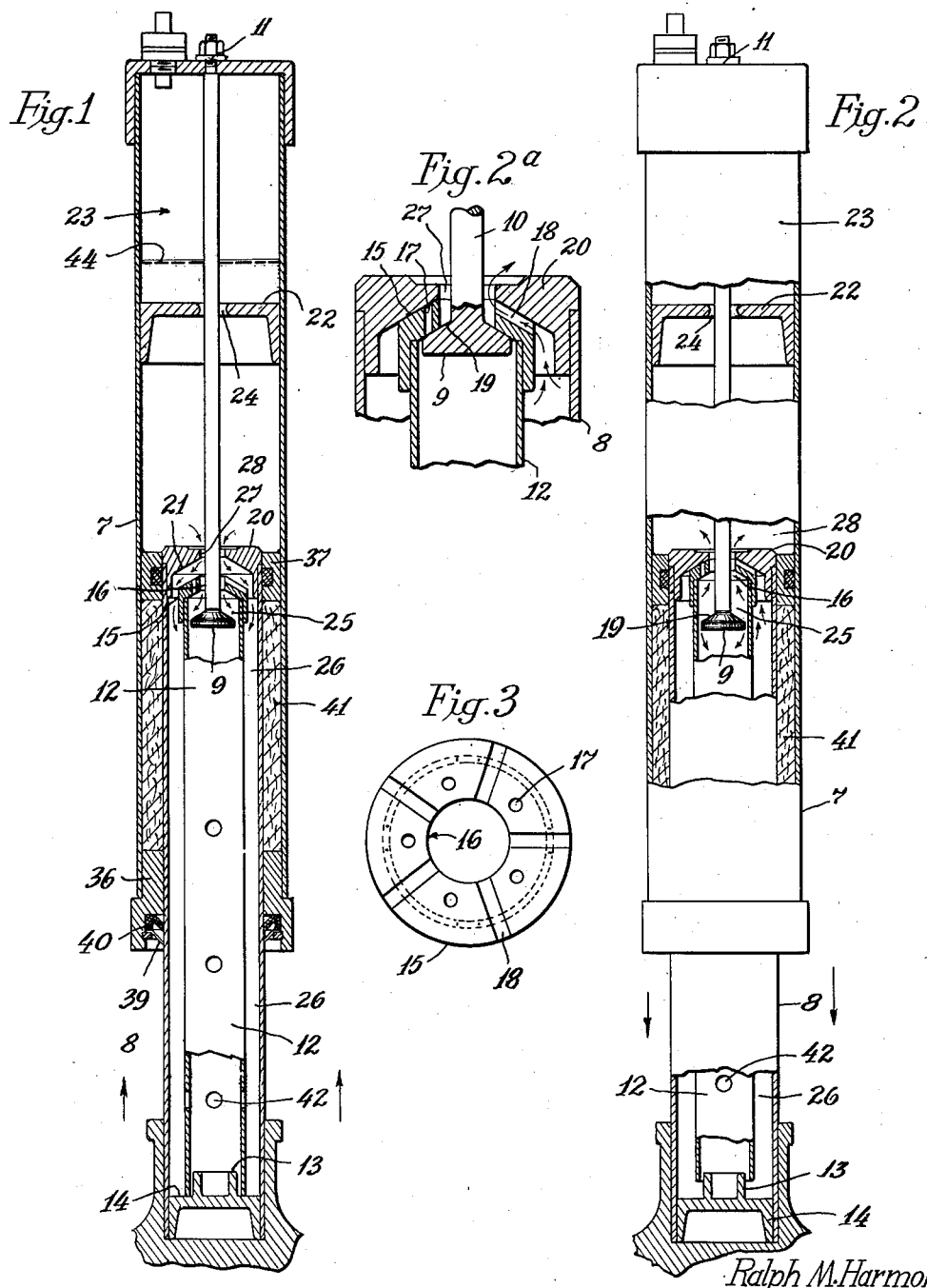

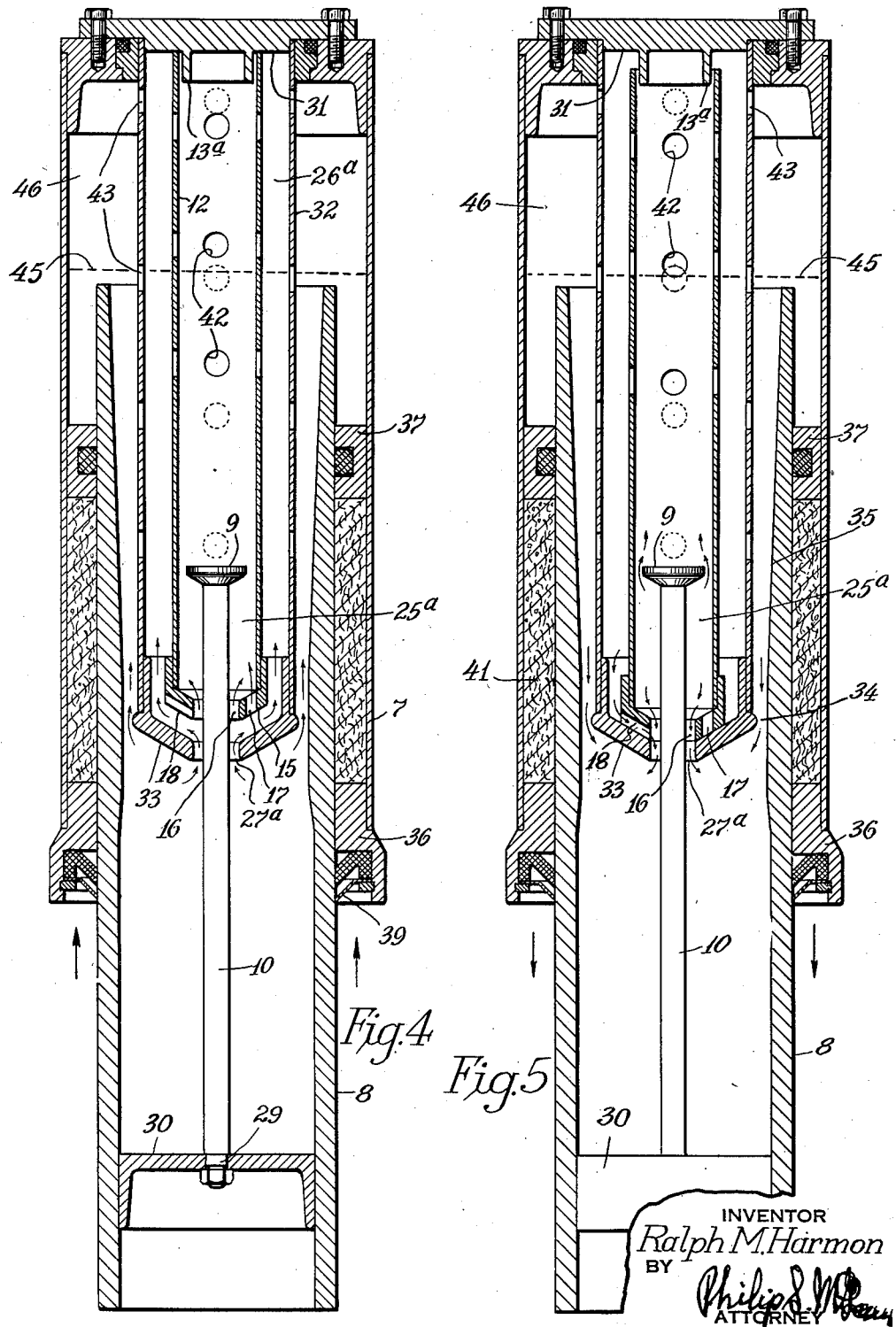

2,470,616

UNITED STATES PATENT OFFICE 2,470,616

SHOCK ABSORBER

Ralph M. Harmon, Wichita, Kans., assignor to Beech Aircraft Corporation, Wichita, Kans., a corporation of Delaware Application June 25, 1946, Serial No. 679,054

5 Claims. (Cl. 267—64)

The invention herein disclosed relates to shock absorbers, particularly those of the air oil type employed with aircraft landing gear.

Special objects of the invention are to provide more positive and efficient rebound control than heretofore attained.

Related objects are to incorporate the rebound control mechanism within the shock absorber structure, without adding objectionable bulk or complexity, to provide such control in a fully automatic, self-servicing form and, particularly, in a form suited to the conditions existing in retractible landing gear.

Further special objects of the invention are to arrange the rebound control mechanism for shock struts either of a longer type where vertical dimensions are ample for such type or for a shorter type construction where the overhead clearance is less.

Other objects are to provide a structure for the purposes outlined, which will be made up of relatively few parts, of simple, rugged, long-wearing design.

Further objects are to provide a construction as outlined, made up of parts which can be manufactured at reasonably low cost and be readily assembled and disassembled.

Further special objects are to provide a construction which will be fully safe and reliable and which will be free of mechanism or parts that might be liable to get out of order.

Other objects and the novel features through which the purposes of the invention are attained are set forth or will appear in the course of the following specification.

The drawings accompanying and forming part of the specification illustrate certain present commercial embodiments of the invention. Structure, however, may be modified and changed as regards these illustrations, all within the true intent and broad scope of the invention as herein defined and claimed.

Figs. 1 and 2 in the drawings are broken longitudinal sectional views of a shock strut embodying one form of the invention in which a distinct air chamber is provided at the top of the main cylinder and showing the parts in compression and extension strokes, respectively;

Fig. 2a is a fragmentary sectional view on a larger scale to show details of the conical orifice plate constituting the inner end of the rebound control cylinder;

Fig. 3 is a plan view of the ported and grooved valvular end of the rebound control cylinder;

Figs. 4 and 5 are broken longitudinal sectional views of another form of the invention in which the air chamber is built into the body of the main cylinder and showing the parts in the compression and extension strokes, respectively.

In both forms of the invention illustrated the main cylinder is designated 7 and the tubular piston operating therein, 8.

An extension stop in the form of a piston head 9 on a stem 10 is carried by one of these members and cooperates with a movable rebound control cylinder associated with the other member of the hydraulic couple.

In the first embodiment illustrated the stem 10 of the extension stop is secured to the head of the main cylinder at 11.

The rebound control cylinder is designated 12 and in this first instance is shown as guided at its lower end over a cylindrical extension 13 on the head portion 14 of the piston element 8. The rebound control cylinder is constructed with an orifice plate 15 having a central metering passage 16 for the stem 10, metering ports 17 and lateral or radially extending grooves or channels 18.

This orifice plate at the end of the rebound control cylinder is shown as conical in shape to match the conical upper face 19 of the extension stop piston head 9.

The upper or inner head 20 of the piston 8 is shown as formed into a conical valve seat 21 for engagement by the outer face of the conical orifice plate 15.

An orifice plate 22 is fixed in the upper end portion of the main cylinder to provide an air chamber 23, this plate having a metering orifice 24 about the stem of the extension stop.

In the compression stroke, flow is substantially as indicated by the arrows in Fig. 1.

The head 9 of the extension stop operates as a loose fitting piston in the rebound control cylinder, thereby providing the effect of a complete, simple hydraulic cylinder or couple. In the compression stroke, under consideration, oil flow is through ports 17 and clearance hole 16 in the conical orifice plate into the space 25 back of piston head 9, positively filling this chamber each time the strut is compressed. In addition, the oil flows over the face of the orific plate into the surrounding annular chamber 26 between the control cylinder 12 and tubular piston 8.

The size, arrangement and detail design of the clearance hole 16 and orifice holes 17, may be varied to obtain the desired flow of oil into the rebound control cylinder chamber 25.

The distribution of oil to chamber 25 and the surrounding chamber 26 may be controlled by the detail design of the main orifice 27 in the inner end of the hollow piston, clearance between piston head 9 and rebound control cylinder, the ports and channels in the orifice plate and combinations of these various details.

In the reverse, extension operation indicated in Fig. 2, with the piston assembly moving toward extended position, oil trapped in the chamber 25 back of piston head 9, lifts the rebound control cylinder over the guide 13 to carry the orifice plate 15 against the inner piston head 20. This closes the orifice holes 17, forcing the oil to be metered out through the clearance hole 16 and through the clearance about the piston head 9 in control cylinder 12. These clearances and their relationship to each other determine the degree and rate of rebound.

The grooves or channels 18 in the face of the conical orifice plate transfer oil from the surrounding annular chamber 26 back into chamber 28 above the main piston and may assist in transferring excess oil that does not enter chamber 25, into chamber 26.

In the second form of the invention illustrated in Figs. 4 and 5, the stem 10 of the extension stop is secured at 29 to the head 30 of the tubular piston 8 and the rebound control cylinder 12 slides over a guide 13a on the head 31 of the main cylinder 7.

The construction and relation of these parts otherwise is substantially the same as before described, but as in this construction there is no inner piston head for cooperation with the rebound control orifice plate, a fixed cylinder 32 is supported from the head of the main cylinder about the rebound check cylinder, carrying a conical head 33 for cooperation with the orifice plate 15.

This head 33 has a main orifice 27a for the stem 10 of the extension stop and the stationary cylinder 32 forms an annular chamber 26a about the rebound check cylinder.

The operation in this second form of the invention is similar to that described for the first form, particularly in that on the compression stroke, Fig. 4, the extension stop piston head 9 and rebound control cylinder 12 will operate as a simple hydraulic cylinder assembly and oil will be forced into chamber 25a back of piston head 9 and into the surrounding annular chamber 26a. On the extension stroke, Fig. 5, oil trapped in chamber 25a back of piston head 9, will close the rebound control cylinder head 15 against stationary head 33 to close off the ports 17 and effect metering of oil flow through clearance passages 16 and 27a, etc., to accomplish complete rebound control.

Additional control is accomplished in this second embodiment of the invention by varying clearance at 34 between the rim of the stationary head 33 and the opposed tapering wall 35 of the tubular piston.

In both forms the essential parts are relatively few in number and of simple, rugged structure, with ample flow passages for both shock absorbing and rebound control purposes. The channels 18 at the end of the rebound control cylinder, in addition to their normal functions of rebound control, enable proper flow-back of the oil in the case of operation with retractable landing gear.

It will be clear from the drawings also that the component parts are readily assembled and that conversely, when necessary, the mechanisms can be quickly disassembled.

The first form illustrated, extended to provide the air chamber at the top, may be preferred for general purposes where sufficient overhead space is available, because of the somewhat simpler construction. The second form may be preferred where the overhead clearance is more limited.

Both types are well adapted to the improved form of cylinder construction disclosed in copending patent application Serial No. 558,755, filed October 14, 1944, Patent 2,412,885 of December 17, 1946, in which the tubular piston is supported and guided in spaced bearing lands 36, 37, at the end and mid-length portions of the cylinder. The structure also is well adapted to the mounting of the protected packing seal, with scraper and wiper features 39, 40, of Patent No. 2,368,137 dated January 30, 1945.

In the fully extended positions the head 9 of the extension stop may engage and clamp the orifice plate 15 against the head 20, Fig. 2, or the head 33, Fig. 5; the latter then acting in effect as stop heads limiting extension of the strut. Because of the corresponding conical or beveled formation, these parts can engage firmly, without injury, and the free mounting of the rebound control cylinder allows these parts to come together in a self adjusting relation.

As shown in the several views, the space between the bearing lands 36, 37, may contain a pad of lubricant-holding material 41.

In both embodiments illustrated the rebound control cylinder is shown as having openings 42 in the end portion remote from the orifice head 15, and in the second form the rebound check cylinder 32 surrounding the control cylinder 12 is also shown as having fluid transfer passages 43 therein.

In the first form of the invention shown, Fig. 1, the approximate oil level is indicated at 44, with air chamber 23 above the same. In the second form shown, Fig. 4, the approximate oil level is indicated at 45, with the air chamber 46 above that. While in both forms shown, the piston element is at the bottom and the barrel or cylinder at the top, it should be understood that the relation may be reversed, that is, the piston be at the top and the barrel at the lower end of the strut, the operation and functioning of parts being the same in both instances.

The extent of free movement of the loosely confined rebound control cylinder 12 is governed by the stop head 20 or 33, Figs. 1 and 4, overstanding the inner end of the same and carried, in the first instance, by the piston sleeve 26 and in the second instance by an extra surrounding sleeve 32 attached to the cylinder element 7. In both forms the rebound control cylinder operates as a floating check valve permitting free flow through the metering orifice 27 or 27a in compression movements, but closing instantly on rebound movements to check rebound regardless of the point of extension of the strut. This is so because of the liquid trapped inside the control cylinder at 25, 25a, between the orifice plate 15 and piston 9 of the extension stop and which at the instant of rebound operates as a transmission medium to shift the control cylinder into engagement with the stop head 20 or 33, thus to close ports 17 in the orifice plate, as in Figs. 2 and 5, and governing rebound movement by the reduced metered flow through radial passages 18 and metering passages 16, 27.

What is claimed is:

1. The herein disclosed shock strut construction comprising companion tubular piston and cylinder members, an extension stop for limiting the extension movement of said members including a stem projecting inwardly from the outer end of one of said members, having an extension stop head at the inner end of the same and a stop plate carried by and at the inner end of the other of said members in position to operate freely over said stem in back of said extension stop head, a rebound check cylinder extending from the outer end of said other member inwardly over said extension stop head and having a ported orifice plate at the inner end of the same disposed between the stop plate carried by said last mentioned other member and said extension stop head carried by the first mentioned member and means for guiding said check cylinder for free longitudinal shifting movements between the outer end of said member and said stop plate at the inner end of said member and whereby said ported orifice plate at the inner end of said check cylinder will be jointly controlled by said stop plate and said extension stop head at the opposite sides of the same.

2. The herein disclosed shock strut construction comprising companion tubular piston and cylinder members, an extension stop for limiting the extension movement of said members including a stem projecting inwardly from the outer end of one of said members, having an extension stop head at the inner end of the same and a stop plate carried by and at the inner end of the other of said members in position to operate freely over said stem in back of said extension stop head, a rebound check cylinder extending from the outer end of said other member inwardly over said extension stop head and having a ported orifice plate at the inner end of the same disposed between the stop plate carried by said last mentioned other member and said extension stop head carried by the first mentioned member and means for guiding said check cylinder for free longitudinal shifting movements between the outer end of said member and said stop plate at the inner end of said member and whereby said ported orifice plate at the inner end of said check cylinder will be jointly controlled by said stop plate and said extension stop head at the opposite sides of the same, said stop plate and orifice plate having fluid metering passages about said stem permitting free movement of the same over the stem and said stop plate, orifice plate and extension stop head having companion engaging conical faces for facilitating self-centering movements of the freely operating rebound check cylinder.

3. The herein disclosed shock strut construction comprising companion tubular piston and cylinder members, an extension stop for limiting the extension movement of said members including a stem projecting inwardly from the outer end of one of said members, having an extension stop head at the inner end of the same and a stop plate carried by and at the inner end of the other of said members in position to operate freely over said stem in back of said extension stop head, a rebound check cylinder extending from the outer end of said other member inwardly over said extension stop head and having a ported orifice plate at the inner end of the same disposed between the stop plate carried by said last mentioned other member and said extension stop head carried by the first mentioned member and means for guiding said check cylinder for free longitudinal shifting movements between the outer end of said member and said stop plate at the inner end of said member and whereby said ported orifice plate at the inner end of said check cylinder will be jointly controlled by said stop plate and said extension stop head at the opposite sides of the same, the cylinder and piston members being arranged with the cylinder at the top and having an air chamber extension in the upper end of the same, the stem of said extension stop being carried by the upper end of said cylinder member and an orifice plate in said cylinder member above the inner end of said piston member loosely surrounding said stem and fixed in said cylinder at a position substantially defining the air chamber in the upper end of the cylinder.

4. The herein disclosed shock strut construction comprising companion tubular piston and cylinder members, an extension stop for limiting the extension movement of said members including a stem projecting inwardly from the outer end of one of said members, having an extension stop head at the inner end of the same and a stop plate carried by and at the inner end of the other of said members in position to operate freely over said stem in back of said extension stop head, a rebound check cylinder extending from the outer end of said other member inwardly over said extension stop head and having a ported orifice plate at the inner end of the same disposed between the stop plate carried by said last mentioned other member and said extension stop head carried by the first mentioned member and means for guiding said check cylinder for free longitudinal shifting movements between the outer end of said member and said stop plate at the inner end of said member and whereby said ported orifice plate at the inner end of said check cylinder will be jointly controlled by said stop plate and said extension stop head at the opposite sides of the same, and a check cylinder fixedly secured to the outer end of said other member and carrying said stop plate at the inner end of the same, said fixed check cylinder freely surrounding said loose rebound check cylinder and ported for passage of fluid into and out of the same.

5. The herein disclosed shock strut construction comprising companion tubular piston and cylinder members, an extension stop for limiting the extension movement of said members including a stem projecting inwardly from the outer end of one of said members, having an extension stop head at the inner end of the same and a stop plate carried by and at the inner end of the other of said members in position to operate freely over said stem in back of said extension stop head, a rebound check cylinder extending from the outer end of said other member inwardly over said extension stop head and having a ported orifice plate at the inner end of the same disposed between the stop plate carried by said last mentioned other member and said extension stop head carried by the first mentioned member and means for guiding said check cylinder for free longitudinal shifting movements between the outer end of said member and said stop plate at the inner end of said member and whereby said ported orifice plate at the inner end of said check cylinder will be jointly controlled by said stop plate and said extension stop head at the opposite sides of the same, said orifice plate having a metering passage about said stem, a port positioned to be closed by said stop plate and a channel extending from said metering passage to the space about said rebound control cylinder.

RALPH M. HARMON.

REFERENCES CITED

The following references are of record in the file of this patent:

UNITED STATES PATENTS

| Number | Name | Date |
|---|---|---|
| 557,487 | Canet | Mar. 31, 1896 |
| 1,819,414 | Gruss | Aug. 18, 1931 |
| 1,831,136 | Reed | Nov. 10, 1931 |
| 1,918,698 | Gruss | July 18, 1933 |
| 2,215,751 | Coleman | Sept. 24, 1940 |
| 2,325,430 | Setz | July 27, 1943 |
| 2,379,388 | Thornhill | June 26, 1945 |